United States Patent
Sadhu et al.

(10) Patent No.: US 11,567,865 B2
(45) Date of Patent: Jan. 31, 2023

(54) METHODS AND APPARATUS FOR PERSISTENT DATA STRUCTURES

(71) Applicant: Samsung Electronics Co., Ltd., Suwon-si (KR)

(72) Inventors: Vamsikrishna Sadhu, Santa Clara, CA (US); Vinod Kumar Daga, Santa Clara, CA (US); Angel Benedicto Aviles, Jr., San Jose, CA (US); Tejas Hunsur Krishna, Sunnyvale, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/785,542

(22) Filed: Feb. 7, 2020

(65) Prior Publication Data
US 2021/0200674 A1 Jul. 1, 2021

Related U.S. Application Data

(60) Provisional application No. 62/956,193, filed on Dec. 31, 2019.

(51) Int. Cl.
*G06F 12/06* (2006.01)

(52) U.S. Cl.
CPC ...... *G06F 12/0646* (2013.01); *G06F 12/0638* (2013.01); *G06F 2212/1032* (2013.01)

(58) Field of Classification Search
CPC ............. G06F 12/0646; G06F 12/0638; G06F 2212/1032
See application file for complete search history.

(56) References Cited

U.S. PATENT DOCUMENTS

| | | | | |
|---|---|---|---|---|
| 9,372,792 | B1* | 6/2016 | Weingarten | G06F 12/0246 |
| 10,055,420 | B1* | 8/2018 | Pogde | G06F 11/1448 |
| 2009/0150599 | A1* | 6/2009 | Bennett | G06F 11/1471 |
| | | | | 711/103 |
| 2014/0250155 | A1* | 9/2014 | Chen | G06F 16/1847 |
| | | | | 707/823 |
| 2016/0110392 | A1* | 4/2016 | Zheng | G06F 16/211 |
| | | | | 707/797 |
| 2017/0315740 | A1* | 11/2017 | Corsi | G06F 3/0688 |
| 2017/0329541 | A1* | 11/2017 | Hayasaka | G06F 3/065 |
| 2018/0239674 | A1* | 8/2018 | Hutchison | G06F 11/1471 |
| 2019/0042098 | A1* | 2/2019 | Li | G06F 3/0656 |

* cited by examiner

*Primary Examiner* — William E. Baughman
(74) *Attorney, Agent, or Firm* — Renaissance IP Law Group LLP (57) ABSTRACT

A method may include storing at least a portion of a metadata buffer of a persistent data structure in volatile memory, and storing at least a portion of a data buffer of the persistent data structure in persistent memory. A system may include a processor, a volatile memory coupled to the processor, and a persistent memory coupled to the processor. The processor may be configured to execute procedures including storing at least a portion of a metadata buffer of a persistent data structure in volatile memory, and storing at least a portion of a data buffer of the persistent data structure in persistent memory. A method may include storing at least a portion of a transient part of a persistent data structure in volatile memory, and storing at least a portion of a persistent part of the persistent data structure in persistent memory.

20 Claims, 5 Drawing Sheets

METHODS AND APPARATUS FOR PERSISTENT DATA STRUCTURES

This application claims priority to, and the benefit of, U.S. Provisional Patent Application Ser. No. 62/956,193 titled "Techniques For Persistent Data Structures" filed Dec. 31, 2019 which is incorporated by reference.

BACKGROUND

1. Field

This disclosure relates generally to persistent data structures, and more specifically to methods and apparatus for storing persistent memory structures.

2. Related Art

Data processing systems typically include volatile memory such as dynamic access random memory (DRAM) which may be accessible at high speeds with low latencies and in relatively small units of data such as bytes. However, the data stored in a volatile memory may be lost when power is removed. Data processing systems also typically include storage such as hard disk drives (HDDs) or solid state drives (SSDs) which are accessible at slower speeds with longer latency and in relatively larger units of data such as blocks and/or pages. This type of data storage is non-volatile and retains its data even when powered down.

Persistent memory may include characteristics of volatile memory and storage. Persistent memory may be non-volatile like storage, but it may be accessible at relatively high speeds with relatively low latencies and in relatively small units of data such as bytes.

Storage systems and other related software and hardware appliances in data centers, cloud deployments, Internet of Things (IoT), and other data processing applications consume persistent memory at large scale to take advantage of the typical performance gains and byte addressable nature of persistent memory to cache hot data structures such as linked lists, trees, hash tables, graphs, etc.

SUMMARY

A method of storing a persistent data structure in a data processing system may include storing at least a portion of a metadata buffer of the persistent data structure in volatile memory, and storing at least a portion of a data buffer of the persistent data structure in persistent memory. The portion of the metadata buffer stored in volatile memory may be stored in a first container, and the portion of the data buffer stored in persistent memory may be stored in a second container that is independent of the first container. The portion of the metadata buffer stared in volatile memory may include transient data. The transient data may include an in-memory link, the state of a buffer, and/or a page pointer. The portion of the data buffer stored in persistent memory may include persistent state data. The persistent state data may include a journal.

The method may further include maintaining a link between the metadata buffer and the data buffer. The link may include a pointer and/or an index. The persistent data structure may include a first persistent data structure, the metadata buffer may include a first metadata buffer, and the data buffer may include a first data buffer, and the method may further include storing at least a portion of a second metadata buffer of a second persistent data structure in volatile memory, and storing at least a portion of a second data buffer of the second persistent data structure in persistent memory. Any number of data buffers and metadata buffers in any number of containers may be used, along with any number of links therebetween. For example, the method may further include maintaining a first link between the first metadata buffer and the first data buffer, maintaining a second link between the second metadata buffer and the second data buffer, and maintaining a third link between the first metadata buffer and the second metadata buffer.

A system may include a processor, a volatile memory coupled to the processor, and a persistent memory coupled to the processor. The processor may be configured to execute procedures include storing at least a portion of a metadata buffer of a persistent data structure in volatile memory, and storing at least a portion of a data buffer of the persistent data structure in persistent memory. The portion of the metadata buffer stored in volatile memory may include transient data. The portion of the data buffer stored in persistent memory may include persistent state data.

A method of storing a persistent data structure in a data processing system may include storing at least a portion of a transient part of the persistent data structure in volatile memory, and storing at least a portion of a persistent part of the persistent data structure in persistent memory. The transient part of the persistent data structure may include a metadata buffer, and the persistent part of the persistent data structure may include a data buffer. The method may further include maintaining a link between the portion of the transient part of the persistent data structure stored in volatile memory and the portion of the persistent part of the persistent data structure stored in persistent memory. The transient part of the persistent data structure may include state data.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Persistent memory may be mapped to the memory space of a processor so that it may be accessed in the same manner as volatile memory such as dynamic access memory (DRAM), i.e., byte-addressable, relatively high speed, low latency, etc. Therefore, there may be a tendency to view persistent memory as simply a non-volatile version of DRAM. However, such a view may lead to the design of persistent data structures having one or more problems that may reduce the reliability, performance, efficiency, and/or cost effectiveness of the data structure and/or the underlying system, including the persistent memory.

For example, persistent memory may only support a limited number of lifetime writes per cell and may only consume significant power when changing the state of a bit during a write operation. However, some conventional persistent data structures, which are intended to be saved entirely in persistent memory, may include transient data such as links and buffer states that may be re-written frequently. This may lead to early cell wear-out and/or increased power consumption.

In some embodiments of a persistent data structure according to the principles of this disclosure, at least a portion of a transient part of a persistent data structure may be stored in volatile memory such as DRAM as described in more detail below.

Figure 1:
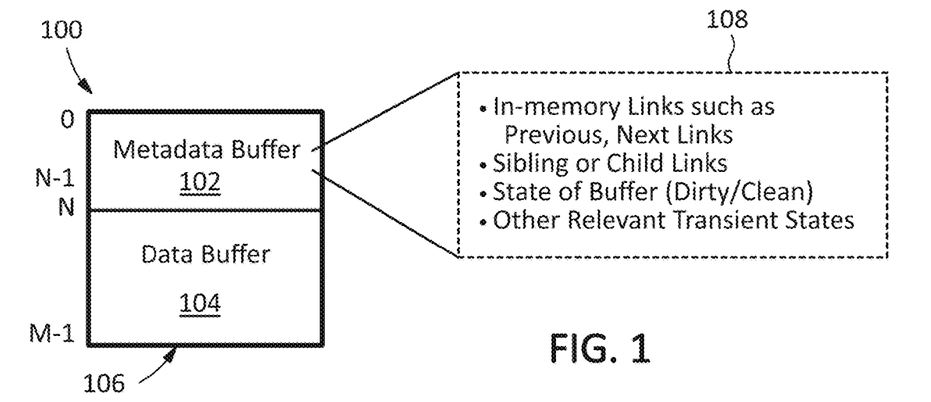
FIG. 1 illustrates a conventional persistent data structure showing an example of transient metadata content.

FIG. 1 illustrates a conventional persistent data structure intended for use with persistent memory. The data structure 100 may include a metadata buffer 102 and a data buffer 104 which may be stored in a single container 106 in persistent memory. A container may refer to a unit of storage in memory which may include contiguous and/or non-contiguous memory locations. In the example illustrated in FIG. 1, the container is illustrated as being formed from contiguous memory locations with the metadata buffer 102 occupying memory locations from 0 to N−1, and the data buffer 104 occupying memory locations from N to M−1.

The metadata buffer 102 of the persistent data structure 100 may include transient data, which may include forms of data to maintain the consistency and/or the order of the data structure preserved by a software layer that may use the persistent data structure. Examples of transient metadata are illustrated in FIG. 1 as example memory contents 108 and may include in-memory links such as previous/next links to maintain pending queues and other relevant queues, sibling and child links, data to indicate the state of buffers (for example, whether a buffer is dirty or clean), and other relevant transient data, including other transient state data.

Some or all of this transient metadata may be byte-addressable. Some or all of this transient metadata may only be relevant and/or necessary during run time. For example, some or all of the transient metadata such as in-memory links may be re-created on-demand when the system in which the persistent data structure 100 is used starts up.

The data buffer 104 of the persistent data structure 100 may include persistent data, which may include forms of data that may form a core part of the persistent data structure. Persistent data may include layout information to index nodes and/or cells within the persistent data structure. Persistent data may also include header information to maintain the state of the data structure. Persistent data may further include information on the state of the data buffer 104 to recover from power failures and/or system crashes. For example, persistent data stored in the data buffer 104 may include a journal that may be configured to help re-recreate the state of a persistent data structure.

Figure 2:
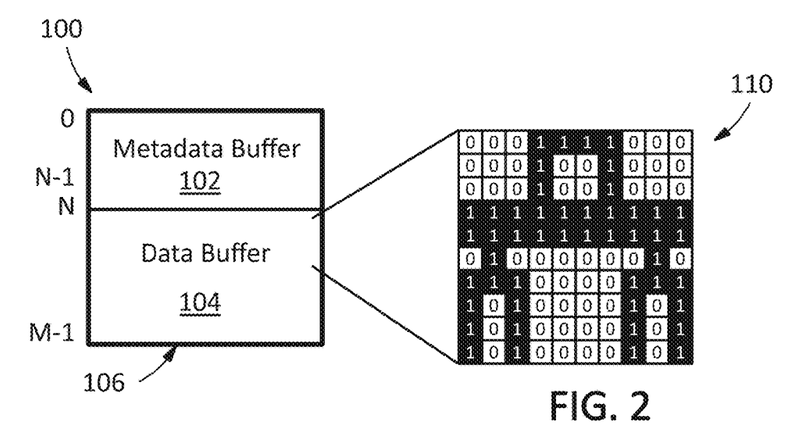
FIG. 2 illustrates a conventional persistent data structure showing an example of persistent data content.

An example of persistent data for a persistent data structure is a bitmap partition 110 as shown in FIG. 2 which illustrates a conventional persistent data structure 100 intended for use with persistent memory. The data structure 100 may include a metadata buffer 102 and a data buffer 104 which may be stored in a single container 106 in persistent memory as in the example of FIG. 1. A bitmap partition 110 may be stored in the data buffer 104. The bitmap partition 110 may represent a region of storage space in any form, for example, carved from an object (e.g., an S3 Object in Amazon Simple Storage Service (Amazon S3), a object in Microsoft Azure Blob storage, an object in Google Cloud Storage, or any other cloud and/or virtualized platform, as well as any desktop, mobile, embedded platform, etc.), file, block storage backed by any kind of storage media such as a hard disc drive (HDD), solid state drive (SSD) (which may use flash memory as a storage medium), etc. The region of storage space represented by the bitmap partition 110 may be further partitioned into multiple blocks and/or pages, of equal or unequal sizes, to be used by an upper level persistent map data structure. Each bit within the bitmap partition 110 may be used, for example, to represent the allocated or free state of a block or page in storage. The partition 110 may also include a commit bit which may be used to avoid block and/or page leaks during power failures and/or system crashes.

Figure 3:
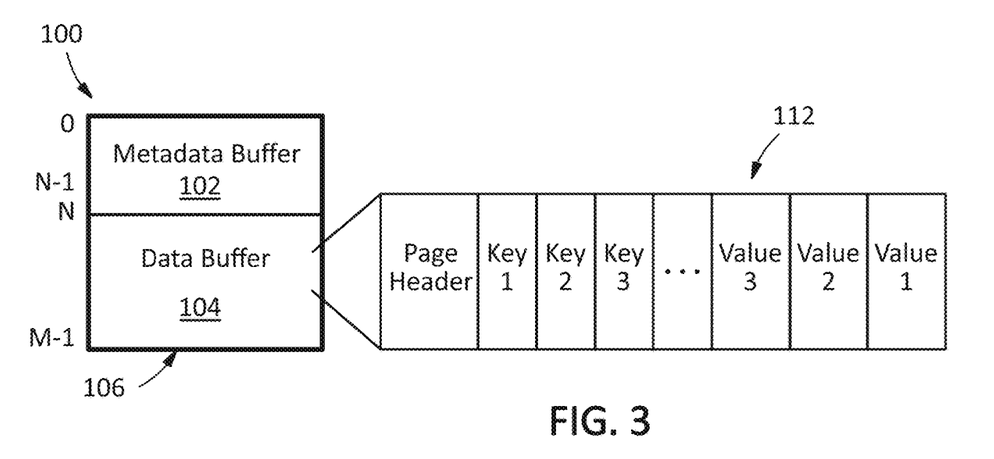
FIG. 3 illustrates a conventional persistent data structure showing another example of persistent data content.

Another example of persistent data for a persistent data structure is tree structure 112 as shown in FIG. 3, which illustrates a conventional persistent data structure 100 intended for use with persistent memory. The data structure 100 may include a metadata buffer 102 and a data buffer 104 which may be stored in a single container 106 in persistent memory as in the examples of FIGS. 1 and 2. The persistent tree structure 112 may be based, for example, on a B+ Tree, a B− Tree, a Radix Tree, a log-structured merge-tree (LSM tree), a Trie, or any other suitable data structure. To maintain the nodes, buckets, pages, etc., of such a persistent tree structure, the persistent tree structure 112 in the data buffer 104 may include key/value pairs Key 1/Value 1, Key 2/Value 2, Key 3/Value 3, . . . to fit and/or adhere to rules imposed by the respective tree implementation. The persistent tree structure 112 may also include a page header to contain crash consistent metadata and other related information to maintain the tree structure 112.

Conventional software algorithms and structures that leverage byte addressable non-volatile memory such as persistent memory may consume persistent memory in various manners. In some implementations, persistent memory may be consumed in a raw fashion with individual persistent data structures such as the data structures 100 illustrated in FIGS. 1-3 occupying unrelated containers of persistent memory. In other implementations, persistent memory may be consumed in a more optimized or structured fashion with multiple persistent data structures arranged to form more extensive persistent data structures. For example, the metadata buffers of multiple persistent data structures may be linked to form a more extensive structure in persistent memory.

Figure 4:
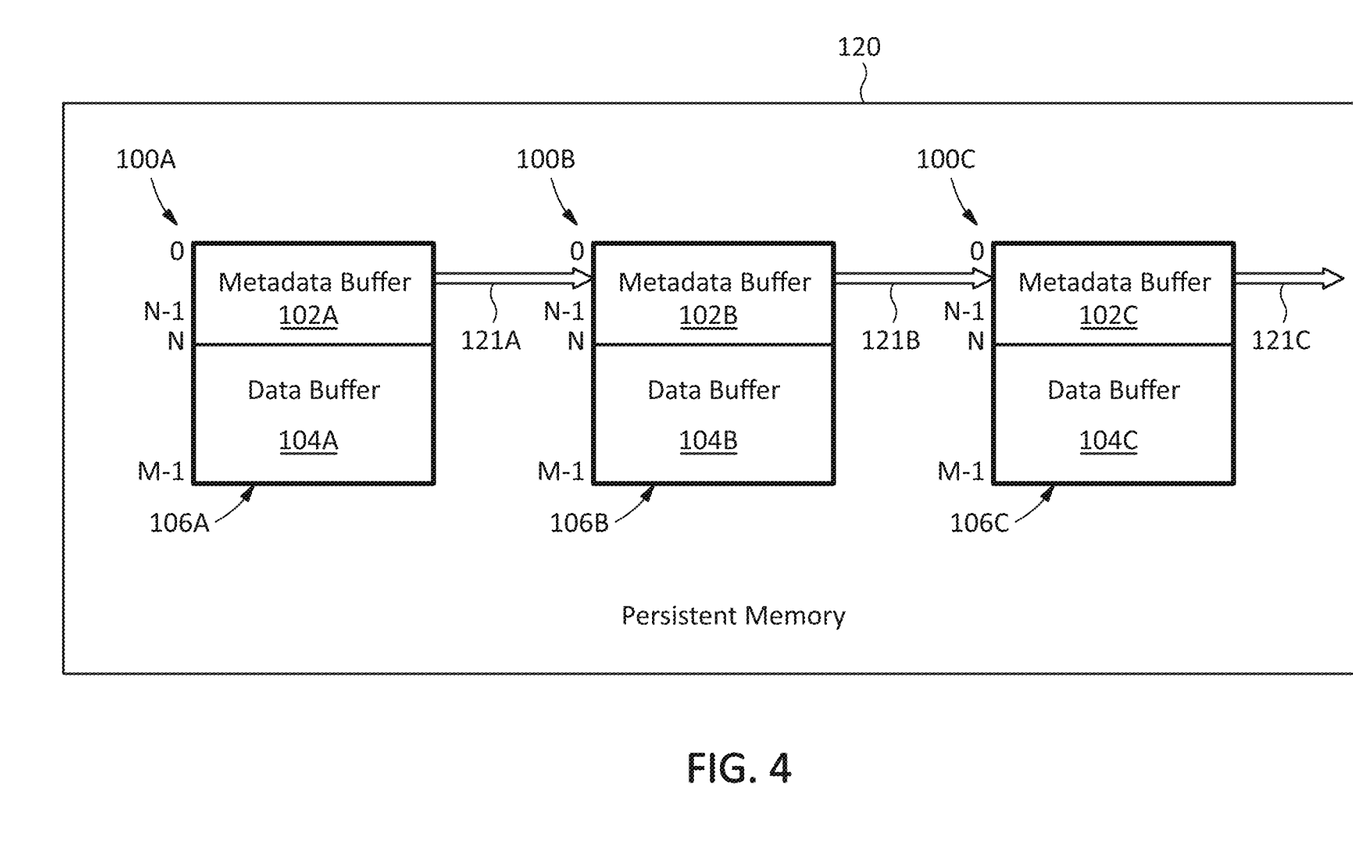
FIG. 4 illustrates a conventional linked data structure including multiple persistent data structures.

FIG. 4 illustrates an example of a conventional linked data structure including multiple persistent data structures 100A, 100B, 100C, . . . each of which may include a corresponding metadata buffer 102A, 102B, 102C, . . . and a corresponding data buffer 104A, 104B, 104C, . . . . Each of the multiple data structures 100A, 100B, 100C, . . . may be stored in a corresponding container 106A, 106B, 106C, . . . in persistent memory 120. Mapping between the data structures 100A, 100B, 100C, . . . may be maintained, for example, by links such as addressable mapping links 121A, 121B, 121C, . . . .

The conventional persistent data structures and memory implementations described above with respect to FIGS. 1-4 may have any or all of the following disadvantages and/or problems.

As mentioned above, persistent memory may only support a limited number of lifetime writes per cell. However, some or all of the transient data such as links, buffer state data, etc., stored in a metadata buffer may be written frequently during run time, and may thus degrade the lifetime of the memory cells.

Moreover, as discussed above, some or all of this transient data may only be relevant and/or necessary during run time, and therefore it may not need to be stored in persistent memory. This may result in inefficient persistent memory usage because the persistent memory space occupied by the transient data may not be available for use by other data that may need to be stored persistently.

The storage of transient data according to the conventional structures and implementations may also lead to reduced performance due to degradation of persistent memory cells, and also because writing data unnecessarily to persistent memory may consume unnecessary time compared to writing the same data to volatile memory such as DRAM.

Additionally, as discussed above, a persistent memory cell may only consume power when changing the state of a bit during a write operation, and thus, a persistent memory controller may only rewrite the contents of a persistent memory cell when the value of the cell has changed. In contrast, volatile memory may constantly consume a given amount of power. For example, DRAM may require frequent periodic refreshing even if the state of the data stored therein does not change, and therefore, writing to DRAM may consume little or no additional power. Thus, writing transient metadata to persistent memory when it could be written to DRAM instead may lead to increased energy consumption.

In some embodiments according to the principles of this disclosure, metadata and data fields and/or buffers for persistent data structures may be separated according to the needs of software that uses the persistent data structures. The metadata and data may be stored in separate containers in volatile and persistent memory, respectively. For example, a metadata buffer may be stored in DRAM, while a data buffer may be stored in persistent memory (PMEM). The metadata may include in-memory links such as previous/next links to maintain pending queues and other relevant queues, sibling and child links, links for linked list data structures, data to indicate the state of buffers (for example, whether a buffer is dirty or clean), page pointers for tree, graph and other data structures, and other relevant volatile or transient data, including other transient state data. The data buffer may include persistent data, which may include forms of data that may form a core part of the persistent data structure. Persistent data may include layout information to index nodes and/or cells within the persistent data structure. Persistent data may also include header information to maintain the state of the data structure. Persistent data may further include information on the state of the data buffer which may be necessary and/or helpful to recover from power failures and/or system crashes. For example, persistent data stored in the data buffer may include a journal that may be configured to help re-recreate the state of a persistent data structure.

In some embodiments, the separate containers, which may be byte addressable, may be dedicated and/or independent and may span contiguous or non-contiguous memory locations. In some embodiments, the metadata and data buffers may be mutually exclusive, for example, with the metadata buffer and data buffer in DRAM and PMEM, exclusively, maintaining unique copies of data.

Figure 5:
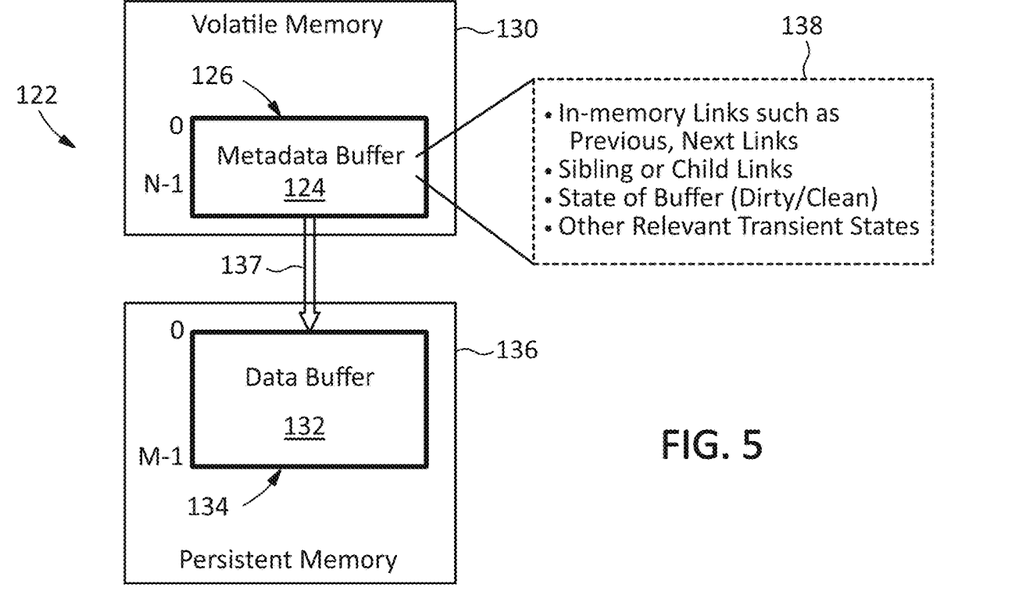
FIG. 5 illustrates an embodiment of a persistent data structure showing an example of transient metadata content according to some principles of this disclosure.

FIG. 5 illustrates an embodiment of a persistent data structure according to some principles of this disclosure. The persistent data structure 122 may include a metadata buffer 124 that may be stored in a first container 126 in volatile memory such as DRAM 130. The persistent data structure 122 may also include a data buffer 132 which may be stored in a separate container 134 in persistent memory 136. Each of the containers 126 and 134 may refer to a unit of storage in memory which may include contiguous and/or non-contiguous memory locations. In the example illustrated in FIG. 5, the container 126 in volatile memory is illustrated as being formed from contiguous memory locations with the metadata buffer 124 occupying memory locations from 0 to N−1. The container 134 in persistent memory is illustrated as being formed from contiguous memory locations with the data buffer 132 occupying memory locations from 0 to M−1.

The persistent data structure 122 may also include a link 137 that is maintained between the metadata buffer 124 and data buffer 132. The link may be implemented as a pointer, an index (e.g., integer) with location details, or in any other suitable manner. The link 137 may be volatile or persistent.

The metadata buffer 124 may include a volatile state of the persistent data structure 122. For example, the metadata buffer 124 may include transient data, which may include forms of data to maintain the consistency and/or the order of the data structure preserved by a software layer that may use the persistent data structure. Examples of transient metadata are illustrated in FIG. 5 as example memory contents 138 and may include in-memory links such as previous/next links to maintain pending queues and other relevant queues, sibling and child links, data to indicate the state of buffers (for example, whether a buffer is dirty or clean), and other relevant transient data, including other transient state data.

Some or all of this transient metadata may be byte-addressable. Some or all of this transient metadata may only be relevant and/or necessary during run time. For example, some or all of the transient metadata such as in-memory links may be re-created on-demand when the system in which the persistent data structure 122 is used starts up, restarts, recovers from a power fault and/or system crash, or any other event and/or condition that may result in a loss of data in volatile memory.

The data buffer 132 of the persistent data structure 122 may include persistent data, which may include forms of data that may form a core part of the persistent data structure. Persistent data may include layout information to index nodes and/or cells within the persistent data structure. Persistent data may also include header information to maintain the state of the data structure. Persistent data may further include information on the state of the data buffer 132 to recover from power failures and/or system crashes. For example, persistent data stored in the data buffer 132 may include a journal that may be configured to help re-recreate the state of a persistent data structure.

Figure 6:
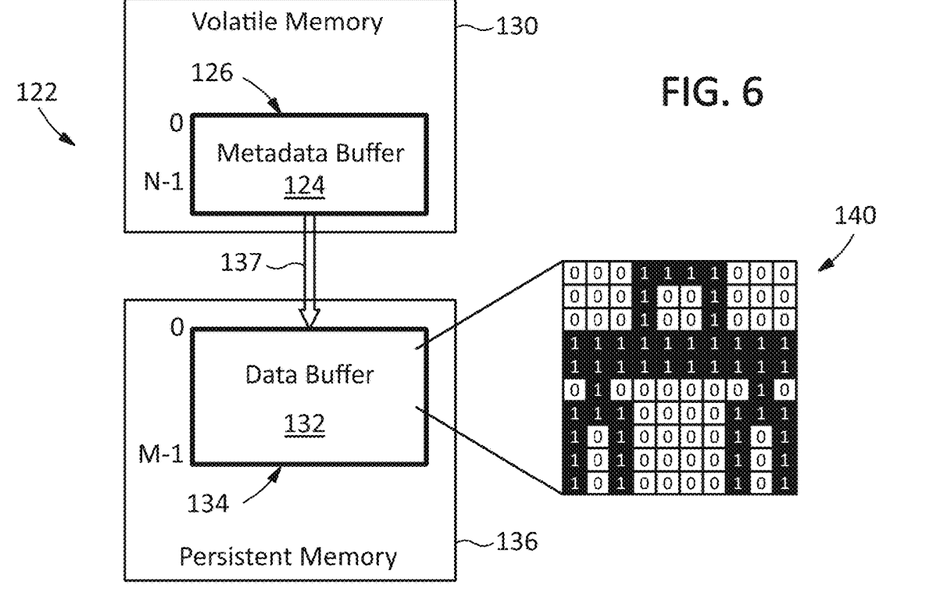
FIG. 6 illustrates an embodiment of a persistent data structure showing an example of persistent data content according to some principles of this disclosure.

FIG. 6 illustrates another embodiment of a persistent data structure according to some principles of this disclosure. The embodiment illustrated in FIG. 6 may be similar to that illustrated in FIG. 5 where like numbers in each figure may indicate like features, and where the metadata buffer 124 may include a volatile state of the persistent data structure 122. The embodiment of FIG. 6, however, illustrates an example bitmap partition 140 may be stored in the data buffer 132. The bitmap partition 140 may represent a region of storage space in any form, for example, carved from an object (e.g., an S3 Object in Amazon Simple Storage Service (Amazon S3), a object in Microsoft Azure Blob storage, an object in Google Cloud Storage, or any other cloud and/or virtualized platform, as well as any desktop, mobile, embedded platform, etc.), file, block storage backed by any kind of storage media such as a hard disc drive (HDD), solid state drive (SSD) (which may use flash memory as a storage medium), etc. The region of storage space represented by the bitmap partition 140 may be further partitioned into multiple blocks and/or pages, of equal or unequal sizes, to be used by an upper level persistent map data structure. Each bit within the bitmap partition 140 may be used, for example, to represent the allocated or free state of a block or page in storage. The partition 140 may also include a commit bit which may be used to avoid block and/or page leaks during power failures and/or system crashes.

Figure 7:
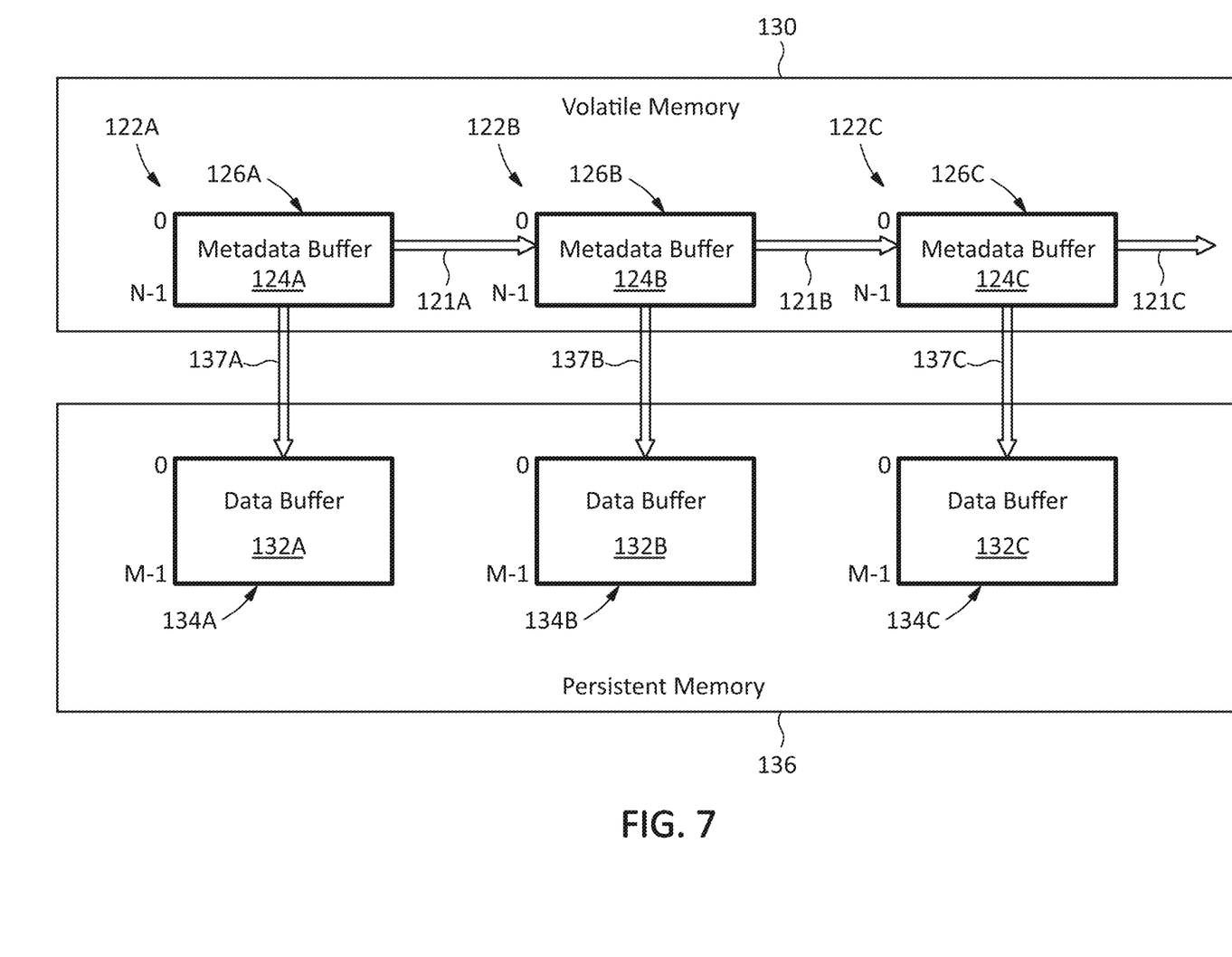
FIG. 7 illustrates an embodiment of a linked persistent data structure according to some principles of this disclosure.

FIG. 7 illustrates an embodiment of a linked persistent data structure according to some principles of this disclosure. The embodiment illustrated in FIG. 7 may include multiple persistent data structures 122A, 122B, 122C, each of which may include a corresponding metadata buffer 124A, 124B, 124C, . . . that may be stored in a corresponding first container 126A, 126B, 126C, . . . in volatile memory such as DRAM 130. Each of the multiple persistent data structures 122A, 122B, 122C, . . . may also include a corresponding data buffer 132A, 132B, 132C, . . . each of which may be stored in a separate corresponding second container 134A, 134B, 134C, . . . in persistent memory 136. Each of the multiple persistent data structures 122A, 122B, 122C, . . . may be similar to those illustrated in FIGS. 5 and 6, where like numbers in each figure may indicate like features.

Each of the multiple persistent data structures 122A, 122B, 122C, . . . may also include a corresponding link 137A, 137B, 137C, . . . that is maintained between the corresponding metadata buffer 124A, 124B, 124C, . . . and the corresponding data buffer 132A, 132B, 132C, . . . . Each of the links may be implemented as a pointer, an index (e.g., integer) with location details, or in any other suitable manner. The links 137A, 137B, 137C, . . . may be volatile or persistent.

Mapping between the data structures 122A, 122B, 122C, . . . may be maintained, for example, by links such as addressable mapping links 121A, 121B, 121C, . . . between the metadata buffers 124A, 124B, 124C, . . . . Any number of data buffers and metadata buffers in any number of containers may be used, along with any number of links therebetween.

In some embodiments according to this disclosure, and depending on implementation details, storing some or all of the metadata of a persistent memory structure in volatile memory may reduce power consumption. This may be because the number of writes to DRAM may have little or no effect on overall power consumption because DRAM may need to be periodically refreshed (read and rewritten), and thus, refresh dominates the power consumption, thereby resulting in a relatively high power requirement for DRAM compared to persistent memory regardless of the number of writes.

In some embodiments according to this disclosure, and depending on implementation details, moving some or all of the metadata of a persistent memory structure to volatile memory may reduce write-amplification that may be caused by storing the metadata in persistent memory. This may eventually improve the performance and/or lifespan of the underlying persistent memory, either immediately or on a longer time scale.

In some embodiments according to this disclosure, and depending on implementation details, storing some or all of the metadata of a persistent memory structure in volatile memory may result in improved or optimized consumption and/or utilization of persistent memory which may be a relatively expensive component.

In some embodiments according to this disclosure, and depending on implementation details, persistent data structures may be deployed in configurations of buffers and/or containers that may be friendly to persistent memory, and may provide simple and easy techniques for deploying complex persistent data structures on persistent memory including storage class persistent memory.

In some embodiments, any of the principles of this disclosure may implemented with any type or level of software, firmware, etc. For example, persistent data structures having transient metadata located in volatile memory may be deployed in an application, a kernel, a device driver, any type of application programming interface (API), etc. Some example implementations may include an input/output (I/O) stack of scale out network attached storage (NAS) and object SSD storage.

In some embodiments, only a portion of the transient and persistent parts of a persistent data structure (metadata buffer and data buffer) may be stored in volatile and persistent memory, respectively. For example, the storing of any portion of the metadata in volatile memory may provide one or more advantages according to principles of this disclosure, even if some of the metadata remains in persistent memory. Likewise, some of the persistent part of a persistent data structure may be stored in other types of non-volatile memory.

In some embodiments, byte-addressable may include any type of access in relatively small units such as bytes, words, nibbles, etc. in contrast to the relatively large units such as blocks and/or pages used to access storage devices.

Figure 8:
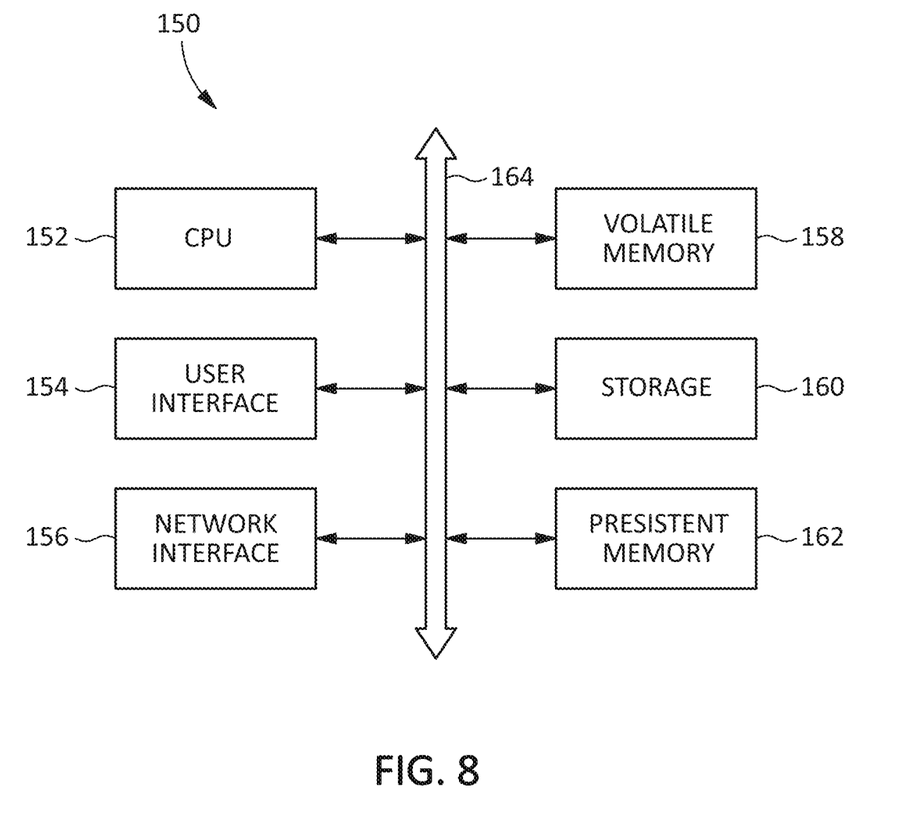
FIG. 8 illustrates an embodiment of a computing system according to this disclosure.

FIG. 8 illustrates an embodiment of a computing system according to this disclosure. The system 150 of FIG. 8 may be used to implement any or all of the methods and/or apparatus described in this disclosure. The system 150 may include a central processing unit (CPU) 152, a user interface 154, a network interface 156, volatile memory 158, storage 160, and persistent memory 162. However, the principles of this disclosure are not limited to implementation with any of the components illustrated in FIG. 8 but may be realized with any suitable hardware, software or combinations thereof. In different embodiments, the system may omit any of these components or may include duplicates, or any additional numbers of, any of the components, as well as any other types of components to implement any of the methods and/or apparatus described in this disclosure.

The CPU 152 may include any number of cores, caches, bus and/or interconnect interfaces and/or controllers. The volatile memory 158 may include any arrangement of dynamic and/or static RAM, etc. The storage 160 may include hard disk drives (HDDs), solid state drives (SSDs), and/or any other type of data storage devices or any combination thereof. The user interface 154 may include any type of human interface devices such as keyboards, mice, monitors, video capture or transmission devices, microphones, speakers, touchscreens, etc. as well as any virtualized or remote versions of such devices. The network interface 156 may include one or more adapters or other apparatus to communicate through Ethernet, Wi-Fi, Bluetooth, or any other computer networking arrangement to enable the components to communicate through physical and/or logical networks, such as an intranet, the Internet, local area networks, wide area networks, etc.

Any or all of the components of the system 150 may be interconnected through a system bus 164 which may collectively refer to various interfaces including power buses, address and data buses, high-speed interconnects such as Serial AT Attachment (SATA), Peripheral Component Interconnect (PCI), Peripheral Component Interconnect Express (PCI-e), System Management Bus (SMB), and any other types of interfaces that may enable the components to work together, either locally at one location, and/or distributed between different locations.

The system 150 may also include various chipsets, interfaces, adapters, glue logic, embedded controllers, such as programmable or non-programmable logic devices or arrays, application specific integrated circuits (ASICs), embedded computers, smart cards, and the like, arranged to enable the various components of the system 150 to work together to implement any or all of the methods and/or apparatus described in this disclosure. Any of the components of the system 150 may be implemented with hardware, software, firmware, or any combination thereof. In some embodiments, any or all of the components may be realized in a virtualized form and/or in a cloud-based implementation with flexible provisioning of resources, for example within a data center, or distributed throughout multiple data centers.

The parts or steps of a method or algorithm and functions described in connection with the embodiments disclosed herein may be embodied directly in hardware, in one or more software modules executed by a processor, or in a combination of the two, including in the system 150. If implemented in software, functions may be stored or transmitted as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium. Any system disclosed herein, or component or portion thereof, may be implemented as a part of a software stack of a larger system. Any system disclosed herein, or component or portion thereof, may be implemented as its own software stack.

The embodiments disclosed above have been described in the context of various implementation details, but the principles of this disclosure are not limited these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method of storing data in a data processing system, the method comprising:
storing at least a portion of a metadata element of a persistent data structure in volatile memory; and
storing at least a portion of a data element of the persistent data structure in persistent memory;
wherein the metadata element comprises information to maintain at least one of an order or a consistency of the persistent data structure.

2. The method of claim 1, wherein:
the portion of the metadata element stored in volatile memory is stored in a first container; and
the portion of the data element stored in persistent memory is stored in a second container that is independent of the first container.

3. The method of claim 1, wherein the portion of the metadata element stored in volatile memory includes transient data.

4. The method of claim 3, wherein the transient data comprises an in-memory link.

5. The method of claim 3, wherein the transient data comprises the state of at least one of the metadata element or the data element.

6. The method of claim 3, wherein the transient data comprises a page pointer.

7. The method of claim 1, wherein the portion of the data element stored in persistent memory includes persistent state data.

8. The method of claim 7, wherein the persistent state data comprises a journal.

9. The method of claim 1, wherein the persistent data structure comprises a first persistent data structure, the metadata element comprises a first metadata element, and the data element comprises a first data element, the method further comprising:
storing at least a portion of a second metadata element of a second persistent data structure in volatile memory; and
storing at least a portion of a second data element of the second persistent data structure in persistent memory.

10. The method of claim 9, further comprising:
maintaining a first link between the first metadata element and the first data element;
maintaining a second link between the second metadata element and the second data element; and
maintaining a third link between the first metadata element and the second metadata element.

11. The method of claim 1, wherein the metadata element comprises a link from the metadata element to the data element.

12. A system comprising:
a processor;
a volatile memory coupled to the processor; and
a persistent memory coupled to the processor;
wherein the processor is configured to execute procedures comprising:
- storing at least a portion of a metadata element of a persistent data structure in volatile memory; and
- storing at least a portion of a data element of the persistent data structure in persistent memory; and wherein the metadata element comprises an in-memory link.

13. The system of claim 12, wherein the portion of the metadata element stored in volatile memory includes transient data.

14. The system of claim 12, wherein the portion of the data element stored in persistent memory includes persistent state data.

15. The system of claim 12, wherein the in-memory link comprises one or more of a previous link or a next link.

16. The system of claim 12, wherein the in-memory link comprises one or more of a sibling link or a child link.

17. The system of claim 12, wherein the in-memory link comprises a link to maintain a pending queue.

18. A method of storing a persistent data structure in a data processing system, the method comprising:
- storing at least a portion of a transient part of the persistent data structure in volatile memory; and
- storing at least a portion of a persistent part of the persistent data structure in persistent memory;

wherein the portion of the transient part of the persistent data structure comprises information to indicate a clean state of a buffer.

19. The method of claim 18, wherein:
the transient part of the persistent data structure comprises a metadata element; and
the persistent part of the persistent data structure comprises a data element.

20. The method of claim 18, wherein the transient part of the persistent data structure comprises state data.

* * * * *